United States Patent
Lo (10) Patent No.: US 11,669,002 B2
(45) Date of Patent: Jun. 6, 2023

(54) ILLUMINATION SYSTEM AND PROJECTION DEVICE

(71) Applicant: Coretronic Corporation, Hsin-Chu (TW)

(72) Inventor: Yi-Chien Lo, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/505,629

(22) Filed: Oct. 20, 2021

(65) Prior Publication Data

US 2022/0404691 A1   Dec. 22, 2022

(30) Foreign Application Priority Data

Jun. 16, 2021 (CN) .......................... 202110663936.2

(51) Int. Cl.
*G03B 21/20* (2006.01)
*G03B 21/00* (2006.01)
(Continued)

(52) U.S. Cl.
CPC ....... *G03B 21/2033* (2013.01); *G03B 21/005* (2013.01); *G03B 21/206* (2013.01);
(Continued)

(58) Field of Classification Search
CPC .... G03B 21/005; G03B 21/008; G03B 21/28; G03B 21/145; G03B 21/206;
(Continued)

(56) References Cited

U.S. PATENT DOCUMENTS

| 5,083,854 A | 1/1992 | Zampolin et al. |
| 5,777,781 A | 7/1998 | Nam et al. |

(Continued)

FOREIGN PATENT DOCUMENTS

| CN | 1139761 | 1/1997 |
| CN | 102375315 | 3/2012 |

(Continued)

OTHER PUBLICATIONS

"Search Report of Europe Counterpart Application", dated Apr. 11, 2022, p. 1-p. 8.

(Continued)

*Primary Examiner* — Sultan Chowdhury
(74) *Attorney, Agent, or Firm* — JCIPRNET (57) ABSTRACT

An illumination system is adapted to provide an illumination light beam. The illumination system includes a light-source module and a light-shape adjustment module. The light-source module is adapted to emit a first light beam. The light-shape adjustment module is disposed on the transmission path of the first light beam and is adapted to adjust the light shape of the first light beam. The light-shape adjustment module includes a first light-diffusing element, a second light-diffusing element, and a first lens element. The first light beam sequentially passes through the first light-diffusing element, the first lens element, and the second light-diffusing element to form the illumination light beam. A projection device having the illumination system is also provided.

17 Claims, 6 Drawing Sheets

(51) Int. Cl.
*H04N 5/74* (2006.01)
*H04N 9/31* (2006.01)

(52) U.S. Cl.
CPC ......... *H04N 5/7441* (2013.01); *H04N 9/3152* (2013.01); *H04N 9/3161* (2013.01)

(58) Field of Classification Search
CPC .............. G03B 21/208; G03B 21/2013; G03B 21/2033; G03B 21/2053; G03B 21/2066; H04N 9/315; H04N 9/317; H04N 9/3102; H04N 9/3108; H04N 9/3138; H04N 9/3152; H04N 9/3155; H04N 9/3158; H04N 9/3161
See application file for complete search history.

(56) References Cited

U.S. PATENT DOCUMENTS

| | | | |
|---|---|---|---|
| 6,359,719 | B1 | 3/2002 | Ori |
| 7,576,916 | B2 | 8/2009 | Amitai |
| 8,189,263 | B1 | 5/2012 | Wang et al. |
| 8,432,614 | B2 | 4/2013 | Amitai |
| 9,239,453 | B2 | 1/2016 | Cheng et al. |
| 9,341,883 | B2 | 5/2016 | Li et al. |
| 9,664,903 | B2 | 5/2017 | An et al. |
| 10,234,696 | B2 | 3/2019 | Popovich et al. |
| 11,303,858 | B1* | 4/2022 | Peckham ............ H04N 9/3111 |
| 2003/0039036 | A1* | 2/2003 | Kruschwitz .......... H04N 9/3132 359/623 |
| 2003/0164814 | A1 | 9/2003 | Starkweather et al. |
| 2006/0250696 | A1 | 11/2006 | McGuire |
| 2008/0158513 | A1 | 7/2008 | Bartlett et al. |
| 2010/0027289 | A1 | 2/2010 | Aiki et al. |
| 2011/0234985 | A1 | 9/2011 | Ryf et al. |
| 2012/0242916 | A1 | 9/2012 | Sawado |
| 2015/0070773 | A1 | 3/2015 | Wang et al. |
| 2015/0346495 | A1 | 12/2015 | Welch et al. |
| 2016/0070104 | A1 | 3/2016 | Yang |
| 2016/0116647 | A1* | 4/2016 | Masson ................ G02B 5/3058 359/207.9 |
| 2016/0295202 | A1 | 10/2016 | Evans et al. |
| 2017/0208308 | A1* | 7/2017 | Iguchi .................. G03B 21/204 |
| 2017/0235143 | A1 | 8/2017 | Chi et al. |
| 2017/0285452 | A1 | 10/2017 | Miura |
| 2018/0031843 | A1 | 2/2018 | Pan |
| 2019/0162950 | A1 | 5/2019 | Lapstun |
| 2019/0208175 | A1* | 7/2019 | Chang .................. H04N 13/122 |
| 2020/0041847 | A1 | 2/2020 | Kobayashi |
| 2020/0292835 | A1 | 9/2020 | Lo |

FOREIGN PATENT DOCUMENTS

| | | |
|---|---|---|
| CN | 102789122 | 11/2012 |
| CN | 107305291 | 10/2017 |
| CN | 110133859 | 8/2019 |
| CN | 110501813 | 11/2019 |
| CN | 108139584 | 8/2020 |
| CN | 111694208 | 9/2020 |
| CN | 112313949 | 2/2021 |
| TW | 201907203 | 2/2019 |
| TW | I678556 | 12/2019 |

OTHER PUBLICATIONS

Hong Hua, et al., "A 3D integral imaging optical see-through head-mounted display", Optics Express, vol. 22, No. 11, May 28, 2014, pp. 13484-13491.

Kaan Aksit, et al., "Varifocal Virtuality: A Novel Optical Layout for Near-Eye Display", SIGGRAPH'17 Emerging Technologies, Jul. 30-Aug. 3, 2017, pp. 1-2.

Andrew Maimone, et al., "Holographic Near-Eye Displays for Virtual and Augmented Reality", ACM Transactions on Graphics vol. 36, Issue 4,Article 85, Jul. 20, 2017, pp. 1-16.

David Dunn, et al., "Membrane AR: varifocal, wide field of view augmented reality display from deformable membranes", SIGGRAPH '17 Emerging Technologies, Jul. 30-Aug. 3, 2017, pp. 1-2.

"Office Action of Taiwan Counterpart Application", dated Sep. 5, 2022, p. 1-p. 6.

* cited by examiner

ILLUMINATION SYSTEM AND PROJECTION DEVICE

CROSS-REFERENCE TO RELATED APPLICATION

This application claims the priority benefit of China application serial no. 202110663936.2, filed on Jun. 16, 2021. The entirety of the above-mentioned patent application is hereby incorporated by reference herein and made a part of this specification.

BACKGROUND

Technical Field

The disclosure relates to an optical device, particularly to a projection device having an illumination system which is applied to a light-field display.

Description of Related Art

With the advancement of display technology and people's yearning for high technology, the near-eye display (NED) and the head-mounted display (HMD) have currently become the products with great development potential. The related applications of near-eye display technology may be divided into augmented reality (AR) technology and virtual reality (VR) technology at this time. In addition, since the light-field near-eye display (LFNED) can provide the light field information at the moment, it solves the problem of vergence-accommodation conflict (VAC) and can provide in-depth image information. It is used in augmented reality technology and virtual reality technology in near-eye display technology.

In a spatially multiplexed light field display, the field image of the display element is transmitted through an optical element, such as a micro-lens array, to stack the parallax images on the retina, so that the user can view the light field image with depth. However, when the angle of the image light beam generated by the display element is larger, it may be projected from the adjacent micro-lens element to produce overlapping images, such as ghost images, which leads to poor image quality of the light field display.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The invention provides an illumination system and a projection device capable of providing better display quality.

Other purposes and advantages of the invention can be further understood from the technical features disclosed in the invention.

In order to achieve one or part or all of the above objects or other objects, the present invention provides an illumination system for providing an illumination light beam. The illumination system includes a light-source module and a light-shape adjustment module. The light-source module is adapted to emit a first light beam. The light-shape adjustment module is disposed on the transmission path of the first light beam and is adapted to adjust the light shape of the first light beam. The light-shape adjustment module includes a first light-diffusing element, a second light-diffusing element, and a first lens element. The first light beam sequentially passes through the first light-diffusing element, the first lens element, and the second light-diffusing element to form the illumination light beam.

In order to achieve one or part or all of the above objects or other objects, the present invention provides a projection device, which includes an illumination system and an imaging system. The illumination system is adapted to emit an illumination light beam. The illumination system includes a light-source module and a light-shape adjustment module. The light-source module is adapted to emit a first light beam. The light-shape adjustment module is disposed on the transmission path of the first light beam and is adapted to adjust the light shape of the first light beam. The light-shape adjustment module includes a first light-diffusing element, a second light-diffusing element, and a first lens element. The first light beam sequentially passes through the first light-diffusing element, the first lens element, and the second light-diffusing element to form the illumination light beam. The imaging system is configured on the transmission path of the illumination light beam. The imaging system includes a reflective light valve, which is configured on the transmission path of the illuminating light beam, and the reflective light valve is adapted to convert the illuminating light beam into an image light beam.

Based on the foregoing description, the embodiments of the present invention have at least one of the following advantages or effects. In the illumination system of the present invention, the light-shape adjustment module includes a first light-diffusing element, a second light-diffusing element, and a first lens element, and can provide sufficient illumination to each image unit correspondingly, and can also provide better uniformity of light emission and image color, and can reduce the overlapping images generated by the light field display, and improve the quality in image display.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
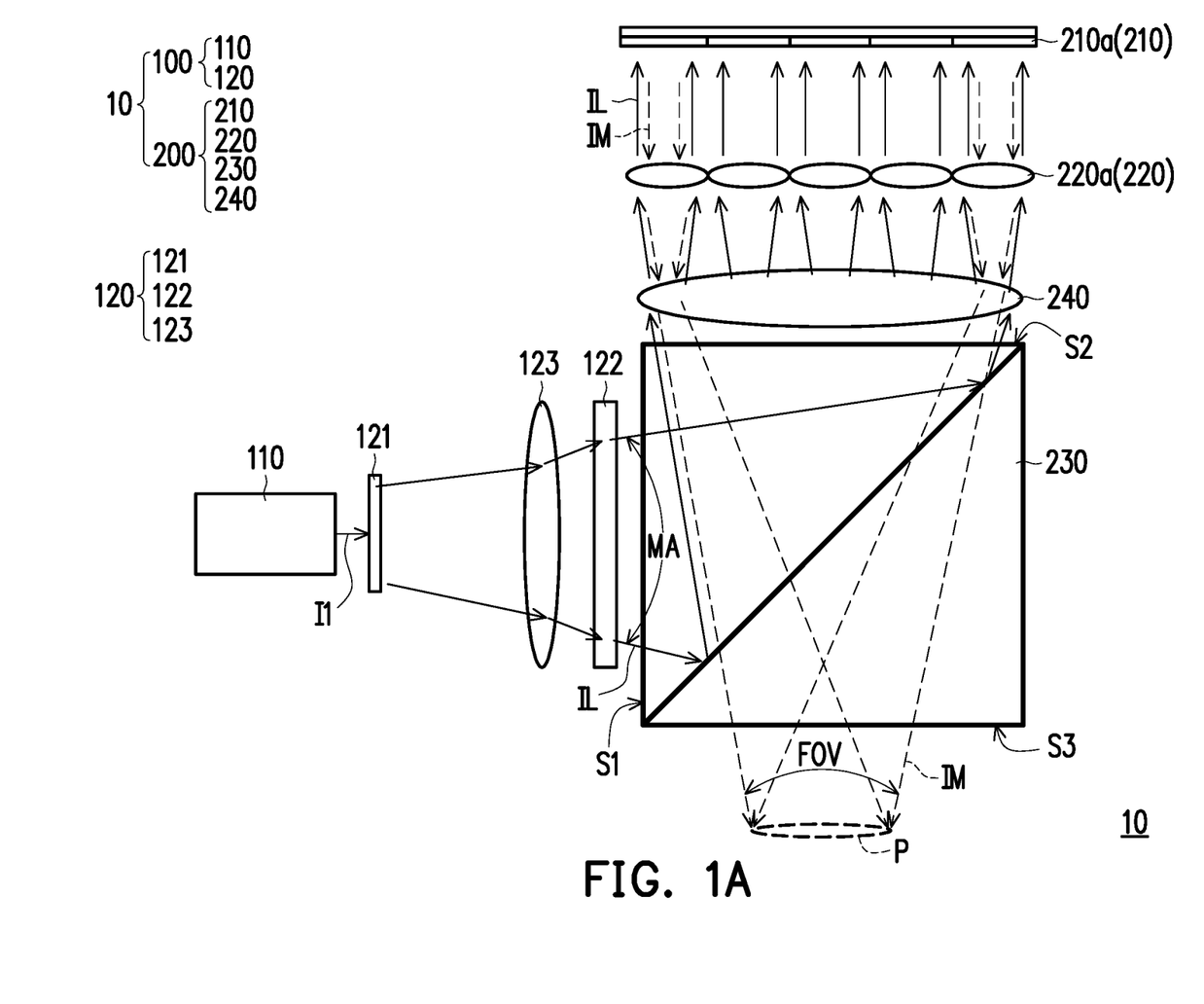
FIG. 1A is a schematic diagram of a projection device according to an embodiment of the invention.
Figure 1B:
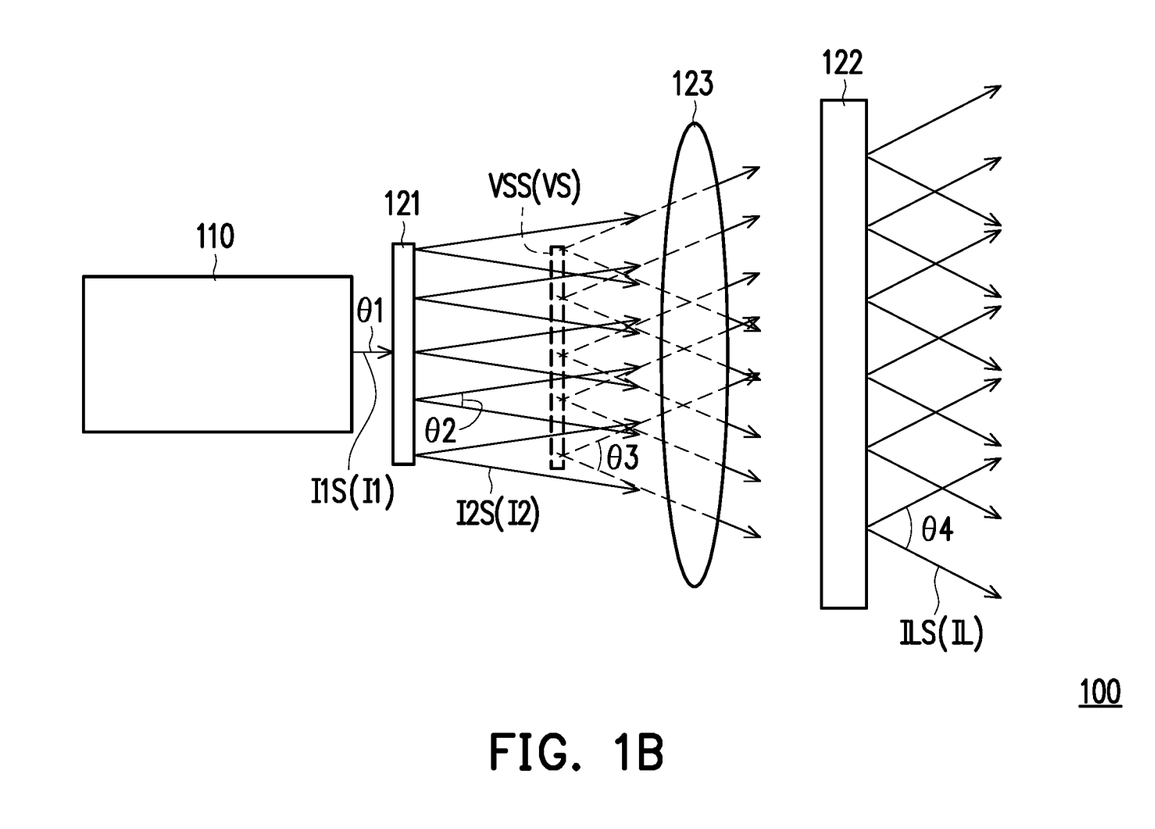
FIG. 1B is a schematic diagram of an illumination system of the projection device of FIG. 1A.

FIG. 1A is a schematic diagram of a projection device according to an embodiment of the invention. FIG. 1B is a schematic diagram of an illumination system of the projection device of FIG. 1A. In FIG. 1A and FIG. 1B, in this embodiment, a projection device 10 includes an illumination system 100 and an imaging system 200. In some embodiments, the projection device 10 of this embodiment may be a near-eye display device configured to be placed in front of at least one eye of the user. In some embodiments, the projection device 10 of this embodiment may be a light-field display device, and the user can view a light-field image with depth.

The illumination system 100 is adapted to emit an illumination light beam IL and provide the illumination light beam IL to the imaging system 200. The illumination system 100 includes a light-source module 110 and a light-shape adjustment module 120. The light-source module 110 is adapted to emit a first light beam I1, and the light-shape adjustment module 120 is disposed on the transmission path of the first light beam I1, and is adapted to adjust the light shape of the first light beam I1. The light-shape adjustment module 120 includes a first light-diffusing element 121, a second light-diffusing element 122, and a first lens element 123. The first light beam I1 sequentially passes through the first light-diffusing element 121, the first lens element 123, and the second light-diffusing element 122 to form the illumination light beam IL. Here, the light shape is, for example, the cross-sectional shape of a light spot of the light beam, and the light-shape adjustment module can adjust the cross-sectional shape and size of the light spot. In the embodiment of the present invention, the illumination system suitably adjusts the light shape of the first light beam I1 through the specific configuration of the light-shape adjustment module 120, so that the projection device provides a better effect of image display.

Please refer to FIG. 1B. In this embodiment, the first light beam I1 is a collimated light beam. In this embodiment, the first lens element 123 is disposed between the first light-diffusing element 121 and the second light-diffusing element 122. Therefore, after the first light beam I1 is emitted from the light-source module 110, it sequentially passes through the first light-diffusing element 121, the first lens element 123, and the second light-diffusing element 122 to form the illumination light beam IL.

Specifically speaking, the first light beam I1 provides a plurality of first sub-beams I1S, and the first light-diffusing element 121 is disposed on the transmission paths of the first sub-beams I1S. The first sub-beams I1S pass through the first light-diffusing element 121 to form a plurality of second sub-beams I2S (second light beams I2), wherein the first sub-beams I1S respectively have a first unit light divergence angle θ1, and the second sub-beams I2S each have a second unit light divergence angle θ2. The first light-diffusing element 121 may include any one of a micro-structured diffuser, a surface scattering diffuser, a volume scattering diffuser, a diffraction optical element (DOE), and a liquid crystal diffuser. The first light-diffusing element 121 is adapted to diffuse the first unit light divergence angles of the first sub-beams I1S (that is, to increase the numerical aperture (NA) of the sub-beam) to form a plurality of second sub-beams I2S. Therefore, the second unit light divergence angle θ2 of the second sub-beam I2S is greater than the first unit light divergence angle θ1 of the first sub-beam I1S. Furthermore, as shown in FIG. 1B, in this embodiment, the first light beam I1 is a collimated light beam, so the first unit light divergence angle θ1 of each first sub-beam I1S is close to 0 degrees. With the first light-diffusing element 121, the first sub-beams I1S of the first light beam I1 become light beams with a specific angle of divergence, for example the second sub-beams I2S. The unit light divergence angle in this article refers to the light-cone angle of the light beam.

Figure 5A:
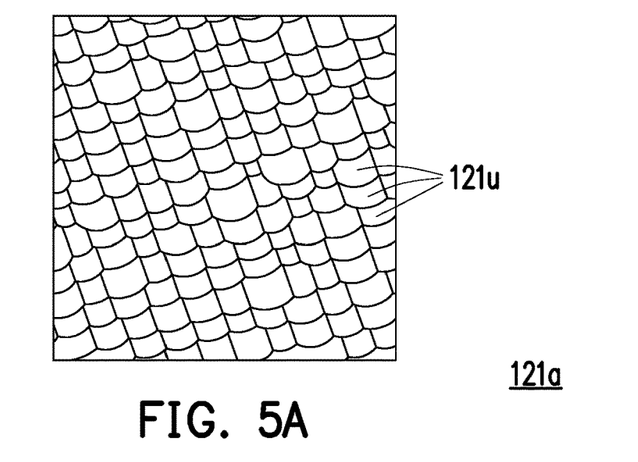
FIG. 5A to FIG. 5C are schematic diagrams of different light-diffusing elements according to embodiments of the present invention.
Figure 5B:
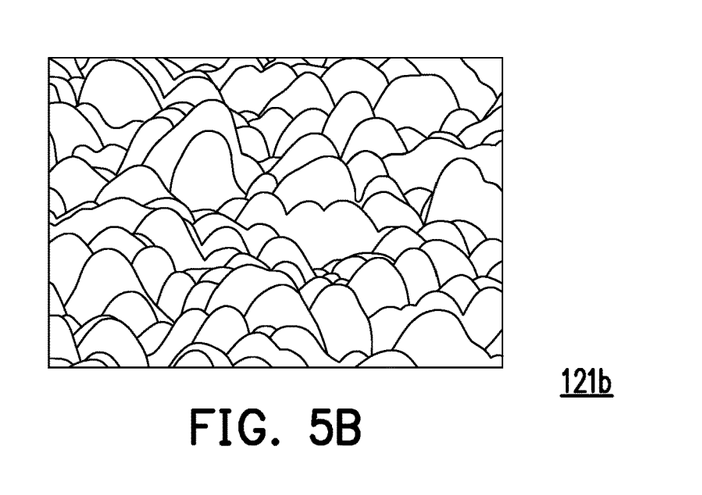
Figure 5C:
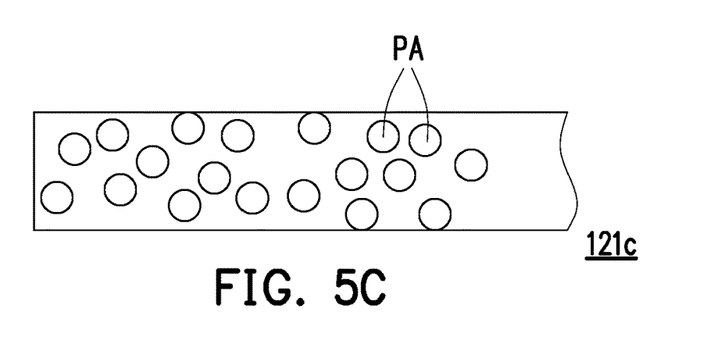

FIG. 5A to FIG. 5C are schematic diagrams of different light-diffusing elements according to embodiments of the present invention. Take the first light-diffusing element 121 as an example. As shown in FIG. 5A, in some embodiments, the first light-diffusing element 121 may include a micro-structured diffuser 121a, which has a plurality of micro-structured diffusion units 121u. The size of the micro-structured diffusion unit 121u is between 10 μm and 500 μm. In some embodiments, the size of the micro-structured diffusion unit 121u is between 10 μm and 100 μm. In some embodiments, as shown in FIG. 5B, the light-diffusing element 121 may also be a surface scattering diffuser 121b whose surface has plenty of uneven structures which diffuse the unit light divergence angle of the light beam. In addition, in some embodiments, as shown in FIG. 5C, the light-diffusing element 121 may also be a volume scattering diffuser 121c with a plurality of scattering particles PA inside to diffuse the unit light divergence angle of the sub-beam.

In this embodiment, the first lens element 123 and the second light-diffusing element 122 are disposed on the transmission paths of the second sub-beams I2S. The second sub-beams I2S sequentially pass through the first lens element 123 and the second light-diffusing element 122 to form a plurality of sub-illumination light beams ILS of the illumination light beam IL.

Specifically speaking, the first light-diffusing element 121 is disposed between the first lens element 123 and the light-source module 110, and the relative position of the first light-diffusing element 121 and the first lens element 123 as well as the proper configuration of the optical properties of the first lens element 123, the first light-diffusing element 121 forms a virtual-image light source VS in front of the first lens element 123. Therefore, when the second sub-beams I2S pass through the first lens element 123, the second sub-beams I2S are deflected (refracted) by the first lens element 123, so that the second sub-beams I2S respectively form on the imaging surface in front of the first lens element 123 a plurality of sub-virtual-image light sources VSS, and the sub-virtual-image light sources VSS overlap each other to form the virtual-image light source VS. The virtual-image light source VS may be regarded as the equivalent light-emitting surface of the light source. And this equivalent light-emitting surface has a good light-emitting uniformity, thereby producing a light mixing effect, and may further improve the color uniformity of the image light beam IM projected to the pupil (human eye) P through the imaging system 200. In some embodiments, the first lens element 123 may include a single positive-diopter lens or a single negative-diopter lens. In other embodiments, the first lens element 123 may include a lens combination composed of more than two lenses. For example, the first lens element 123 may include a single positive-diopter lens, and the first light-diffusing element 121 may be disposed within the focal length of the first lens element 123, so that each part of the first light-diffusing element 121 respectively forms an enlarged sub-virtual-image light source VSS. The size of the virtual-image light source VS in FIG. 1B is approximate to the size of the first light-diffusing element 12, and the position of the virtual-image light source VS is disposed between the first light-diffusing element 12 and the first lens element 123. In other embodiments, there are other sizes and positions of the virtual-image light source VS, to which the present invention does not limit.

After passing through the first lens element 123, the second sub-beams I2S pass through the second light-diffusing element 122 to form the sub-illumination light beams ILS of the illumination light beam IL, wherein the second sub-beams I2S have a third unit light divergence angle θ3 after passing through the first lens element 123. Specifically, the second sub-beams I2S having the third unit light divergence angle θ3 after passing through the first lens element 123 may be regarded as light beams emitted by the virtual-image light source VS. After the second sub-beams I2S having the third unit light divergence angle θ3 pass through the second light-diffusing element 122, the sub-illumination light beams ILS respectively have a fourth unit light divergence angle θ4. The second light-diffusing element 122 may include any one of a micro-structured diffuser, a surface scattering diffuser, a volume scattering diffuser, a diffraction optical element (DOE), and a liquid crystal diffuser to be adapted to diffuse the unit light divergence angle of the second sub-beam I2S (to increase the numerical aperture of the sub-beams) and form the sub-illumination light beams ILS. Therefore, the fourth unit light divergence angle θ4 of each sub-illumination light beam ILS is greater than the third unit light divergence angle θ3 of each second sub-beam I2S after passing through the first lens element 123. Similar to the first light-diffusing element 121, the second light-diffusing element 122 may also include different forms of light-diffusing elements as shown in FIG. 5A to FIG. 5C. The form and type of the first light-diffusing element 121 or the second light-diffusing element 122 are not limited in the present invention.

Please refer to FIG. 1A again. The imaging system 200 is configured on the transmission path of the illumination light beam IL. In this embodiment, the imaging system 200 includes a reflective light valve 210, a microlens array 220, a light guiding element 230, and a second lens element 240. The reflective light valve 210 is adapted to convert the illumination light beam IL to the image light beam IM. The reflective light valve 210 may be a reflective liquid crystal on silicon (LCOS) or a digital micro-mirror device (DMD), etc. The light valve 210 may also include a quarter wave plate. The present invention does not impose restrictions on this. The microlens array 220 includes a plurality of microlenses 220a. In this embodiment, the light guiding element 230 may be a polarizer beam splitter (PBS), but the present invention is not limited to this. The reflective light valve 210, the microlens array 220, the light guiding element 230, and the second lens element 240 are configured on the transmission path of the illumination light beam IL. The illumination light beam IL coming from the second light-diffusing element 122 sequentially passes through the light guiding element 230, the second lens element 240, and the microlens array 220 to be transmitted to the reflective light valve 210.

Specifically, as shown in FIG. 1A, in this embodiment, the light guiding element 230 is, for example, a polarizing light beam splitter, and the light guiding element 230 may include a first surface S1, a second surface S2, and a third surface S3. The first surface S1 is connected to the second surface S2 and the third surface S3, and the second surface S2 and the third surface S3 are opposite to each other, wherein the illumination light beam IL may have a first polarization direction (for example, the S-pole polarization direction). After the illumination light beam IL enters the light guiding element 230 through the first surface S1, the light guiding element 230 reflects the illumination light beam IL and makes it leave the light guiding element 230 through the second surface S2. Then, the illumination light beam IL passes through the second lens element 240 and the microlens array 220 to be projected to the reflective light valve 210. In this embodiment, the second lens element 240 and the microlens array 220 are disposed between the second surface S2 of the light guiding element 230 and the reflective light valve 210, and the microlens array 220 is disposed between the second lens element 240 and the reflective light valve 210. The reflective light valve 210 is adapted to convert the incident illumination light beam IL into the image light beam IM. Specifically, in this embodiment, the reflective light valve 210 includes a plurality of image units 210a. Each of the image units 210a includes a plurality of pixels, and these pixels may correspond to an image frame. The image units 210a may also respectively correspond to different image frames, such as layered images with different depths. In this embodiment, one microlens 220a of the microlens array 220 may correspond to one image unit 210a. The illumination light beam IL passes through the microlenses 220a of the microlens array 220 to form a plurality of sub-illumination areas on the reflective light valve 210 (as described later with respect to FIG. 4A and FIG. 4B), and each sub-illumination area respectively corresponds to one image unit 210a to provide the illumination light beam IL needed by the corresponding image unit 210a. Therefore, the image light beam IM converted by the reflective light valve 210 may present multiple image frames.

The image light beam IM has a second polarization direction (for example, a P-polar polarization direction), wherein the second polarization direction is perpendicular to the first polarization direction. The microlens array 220, the light guiding element 230, and the second lens element 240 are disposed on the transmission path of the image light beam IM. The image light beam IM passes through the microlens array 220, the second lens element 240, and the light guiding element 230 in sequence to be transmitted to a pupil P.

Specifically, as shown in FIG. 1A, in this embodiment, the image light beam IM passes through the microlens array 220 and the second lens element 240 to be transmitted to the light guiding element 230, where it enters the light guiding element 230 through the second surface S2 and penetrates the light guiding element 230. After that, the image light beam IM passes through the third surface S3 of the light guiding element 230 and leaves the light guiding element 230 to be transmitted to the pupil P. For example, in this embodiment, the pupil P may be the position of the emergent pupil of the imaging system 200 or the position of the pupil of the user's eyes. In some embodiments, when the position of the pupil P is the pupil of the user's eye, the projection device may be applied to virtual reality (VR) or augmented reality (AR). In other embodiments, the pupil P is not the pupil of the user's eye, but an aperture is provided at the position of the pupil P. The aperture may be a physical aperture, such as a baffle with an opening, but the present invention is not limited to this. In some embodiments, the projection device may further include an optical waveguide element, and the image light beam IM may pass through the aperture and the optical waveguide element to be transmitted to the user's eyes. In addition, in an embodiment, the position of the pupil P may be set at the focal point of the second lens element 240 to form a telecentric optical architecture.

Furthermore, as shown in FIG. 1A, in this embodiment, the illumination light beam IL has a light-imaging matching angle MA, and the light-imaging matching angle MA of the illumination light beam IL matches a viewing angle FOV of the pupil P of the projection device 10. Specifically speaking, the angle at which the illumination light beam IL enters the first surface S1 of the light guiding element 230 corresponds to the angle at which the image light beam IM leaves the third surface S3 of the light guiding element 230, that is, the angles are approximately the same. In addition, the light shape of the illumination light beam IL entering the first surface S1 of the light guiding element 230 is similar to the light shape of the image light beam IM leaving the third surface S3 of the light guiding element 230. For example, the cross-sectional areas of the light shapes are proportional to each other. In this way, the light-imaging matching angle MA of the illumination light beam IL is matched with the viewing angle FOV of the pupil P, thereby meeting the requirements of the optical path design that forms the viewing angle FOV in the imaging system 200 as needed.

Figure 2:
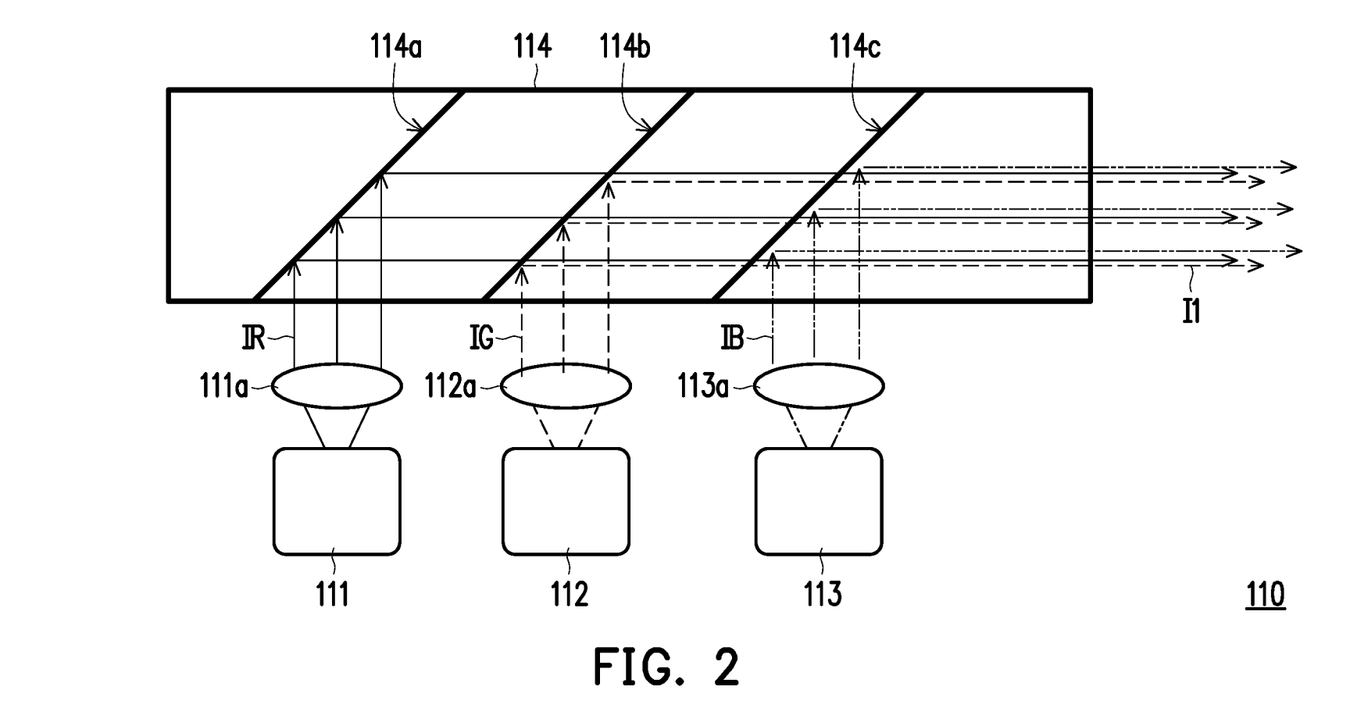
FIG. 2 is a schematic diagram of a light-source module according to an embodiment of the invention.

FIG. 2 is a schematic diagram of a light-source module 110 according to an embodiment of the invention The light-source module 110 of this embodiment may be adapted as the light-source module 110 in the embodiments of FIG. 1A and FIG. 1B, for example. In this embodiment, the light-source module 110 includes a first light-emitting element 111, a second light-emitting element 112, and a third light-emitting element 113, wherein the first light-emitting element 111 may be a red laser diode element for emitting a first color light IR (for example, red light), the second light-emitting element 112 may be a green laser diode element for emitting a second color light IG (for example, green light), and the third light-emitting element 113 may be a blue laser diode element for emitting a third color light IB (for example, blue light). In other embodiments, the first light-emitting element 111, the second light-emitting element 112, and the third light-emitting element 113 may also include light-emitting diode light sources, micro light-emitting diodes, or organic light-emitting diode elements that are suitably configured.

The first light-emitting element 111, the second light-emitting element 112, and the third light-emitting element 113 may respectively be matched with a collimating element 111a, a collimating element 112a, and a collimating element 113a, such that the first color light IR light beam, the second color light IG light beam, and the third color light IB light beam that respectively pass through the collimating element 111a, the collimating element 112a, and the collimating element 113a are all collimated light beams.

In addition, in this embodiment, the light-source module 110 may include a light splitting assembly 114. The light splitting assembly 114 may be a dichroic prism or a dichroic mirror. As shown in FIG. 2, the light splitting assembly 114 is configured to be correspond to the first light-emitting element 111, the second light-emitting element 112, and the third light-emitting element 113 so that the light splitting assembly 114 is disposed on the transmission paths of the first color light IR light beam, the second color light IG light beam, and the third color light IB light beam. And the light splitting assembly 114 includes a first interface 114a, a second interface 114b, and a third interface 114c. The first interface 114a reflects the first color light IR light beam, the second interface 114b allows the first color light IR light beam to pass and reflects the second color light IG light beam, and the third interface 114c allows the first color light IR light beam and the second color light IG light beam to pass and reflects the third color light IB light beam. Through the light splitting assembly 114, the first color light IR light beam, the second color light IG light beam, and the third color light IB light beam are combined into the first light beam I1. With such configuration, the light-source module 110 provides the first light beam I1 that is collimated and includes light of different colors.

Figure 3A:
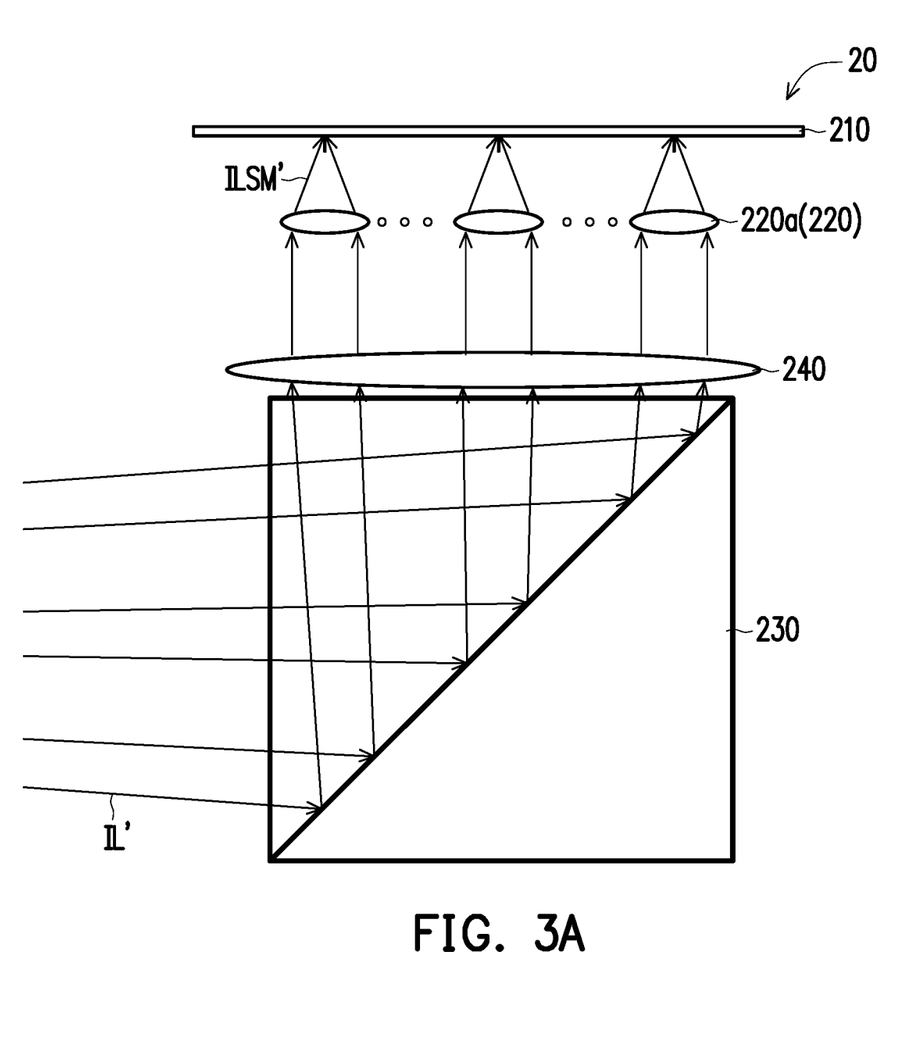
FIG. 3A is a partial schematic diagram of a projection device according to a comparative example.
Figure 3B:
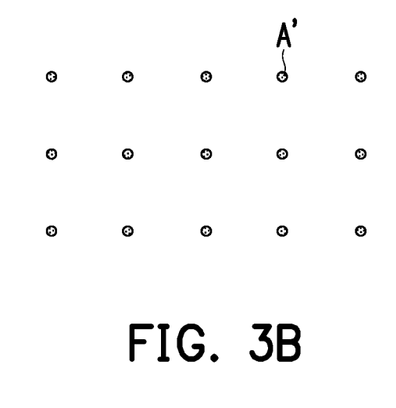
FIG. 3B is a schematic diagram of sub-illumination areas of the projection device of FIG. 3A.

FIG. 3A is a partial schematic diagram of a projection device 20 according to a comparative example. FIG. 3B is a schematic diagram of sub-illumination areas of the projection device 20 of FIG. 3A. In FIG. 3A and FIG. 3B, in the comparative example, the projection device 20 is similar to the projection device 10 of FIG. 1A. Their difference is that the projection device 20 does not include a second light-diffusing element 122. Therefore, in the projection device 20, the light shape of the illumination light beam IL' is different from the illumination light beam IL in the projection device 10 of FIG. 1A. The projection device 20 includes a reflective light valve 210, a microlens array 220, a light guiding element 230, and a second lens element 240. The reflective light valve 210, the microlens array 220, the light guiding element 230, and the second lens element 240 are arranged on the transmission path of the illumination light beam IL', and the illumination light beam IL' sequentially passes the light guiding element 230, the second lens element 240, and the microlens array 220 to be transmitted to the reflective light valve 210.

Specifically speaking, the illumination light beam IL' passes through the microlens 220a of the microlens array 220 to form a plurality of sub-illumination areas A' on the reflective light valve 210. A plurality of sub-illumination areas A' respectively provide illumination of corresponding image units. FIG. 3A and FIG. 3B show an example in which the microlens array 220 includes fifteen microlenses. The illumination light beam IL' can be regarded as including a plurality of sub-illumination light beams, as shown in FIG. 3A and FIG. 3B. In this comparative example, a principle ray ILSM' of each sub-illumination light beam of the illumination light beam IL' passes through the corresponding microlens 220a of the microlens array 220 to be projected to a small area in each image unit 210a on the reflective light valve 210. Therefore, each sub-illumination area A' formed by the illumination light beam IL' on the reflective light valve 210 only covers a small area. In this case, it is difficult for the illumination light beam IL' to provide necessary illumination to the main part of each image unit 210a on the reflective light valve 210.

Figures 4A, 4B:
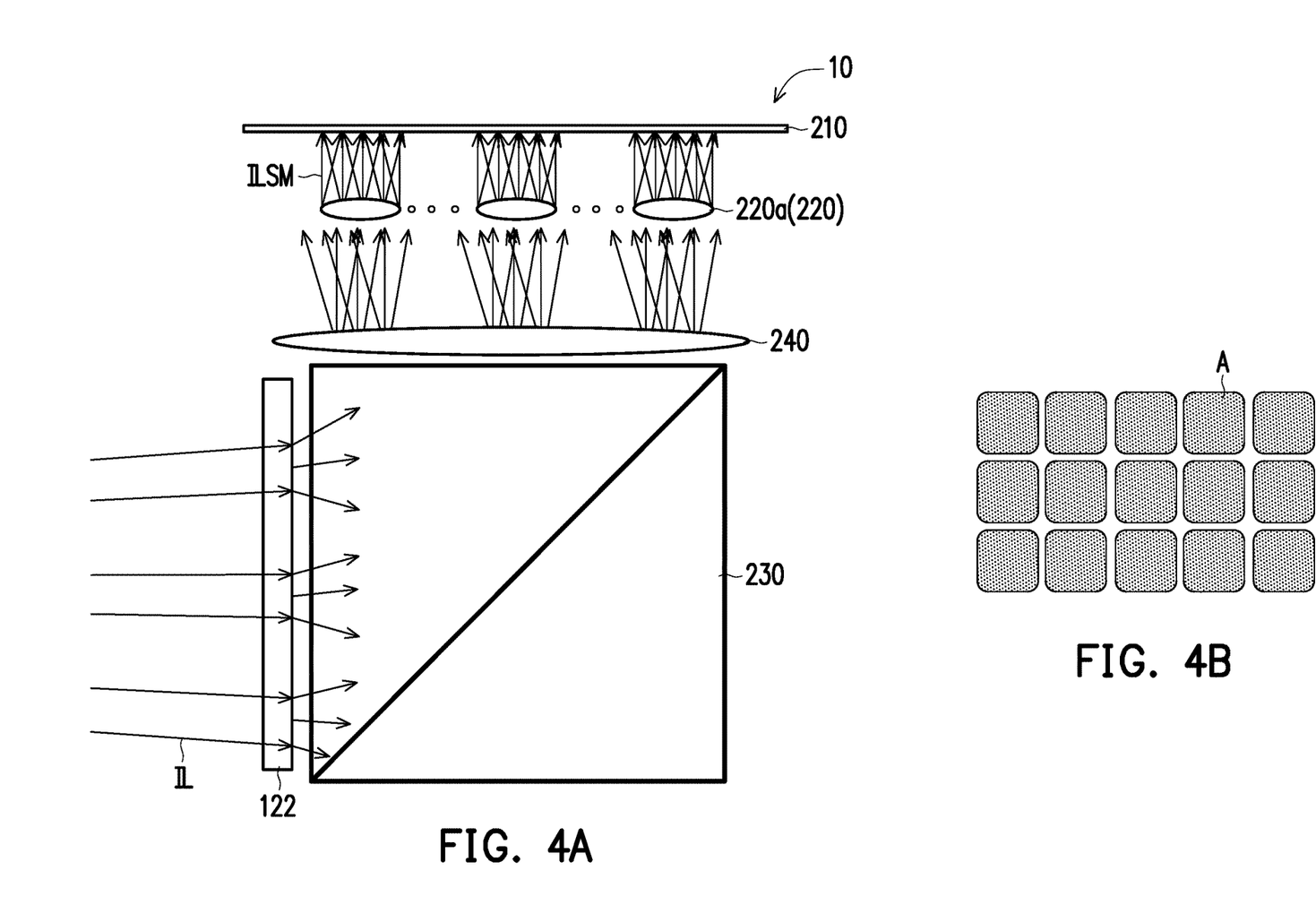
FIG. 4A is a partial schematic diagram of a projection device according to an embodiment of the invention.
FIG. 4B is a schematic diagram of sub-illumination areas of the projection device of FIG. 4A.

FIG. 4A is a partial schematic diagram of a projection device 10 according to an embodiment of the invention. FIG. 4B is a schematic diagram of sub-illumination areas of the projection device 10 of FIG. 4A. In FIG. 4A and FIG. 4B, in this embodiment, the projection device 10 is similar to the projection device 10 of FIG. 1A. As shown in FIG. 4A, the projection device 10 includes a reflective light valve 210, a microlens array 220, a light guiding element 230, and a second lens element 240. The reflective light valve 210, the microlens array 220, the light guiding element 230, and the second lens element 240 are arranged on the transmission path of an illumination light beam IL. The illumination light beam IL sequentially passes through the light guiding element 230, the second lens element 240, and the microlens array 220 to be transmitted to the reflective light valve 210, wherein the illumination light beam IL passes through the corresponding microlens 220a of the microlens array 220 to form a plurality of sub-illumination areas A on the reflective light valve 210, and each sub-illumination area A respectively corresponds to an image unit on the reflective light valve 210.

Its difference from the comparative example shown in FIG. 3A and FIG. 3B is that this projection device 10 includes a second light-diffusing element 122. Compared with the illumination light beam IL' in the comparative example, the second light-diffusing element 122 increases the unit light divergence angle of the sub-illumination light beams in the illumination light beam IL (that is, increasing the numerical aperture of the sub-beams). And, in this embodiment, with the proper configuration of each element, after the illumination light beam IL passes through the second lens element 240 and the microlens 220a of the microlens array 220, the principle ray ILSM of each sub-illumination light beam of the illumination light beam IL becomes parallel light before being projected to the reflective light valve 210. In this case, the size of the sub-illumination area A matches the size of the corresponding image unit 210a, so that the illumination light beam IL needed by the corresponding image unit 210a is provided sufficiently. Meanwhile, the reflected image light beam that is projected from the adjacent microlens 220a may be reduced to a considerable extent, thereby reducing the image overlaps and improving the image quality of the projection device. It may be further described that the size of the sub-illumination area A matching the size of the corresponding image unit 210a may mean that the size of the sub-illumination area A is equal to or greater than the size of the corresponding image unit 210a, so that the sub-illumination area A covers the area of the image unit 210a.

In summary, in the illumination system of the embodiments of the present invention, the light-shape adjustment module includes a first light-diffusing element, a second light-diffusing element, and a first lens element, which is capable of adjusting the light shape of the collimated light beam coming from the light-source module, so that the illumination system has a better uniformity of light emission. And when the illumination system provides the illumination light beam to the imaging system, the principal rays of the sub-illumination light beams are parallel lights before being projected to the reflective light valve, and the size of the sub-illumination area may match the size of the corresponding image unit, so that the illumination light beam needed by each image unit may be fully provided, while the image overlaps can be reduced, improving and the image quality of the projection device.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An illumination system for providing an illumination light beam, and the illumination system comprising: a light-source module and a light-shape adjustment module, wherein
    the light-source module is adapted to emit a first light beam; and the light-shape adjustment module is disposed on a transmission path of the first light beam and is adapted to adjust a light shape of the first light beam, and the light-shape adjustment module comprises: a first light-diffusing element, a second light-diffusing element, and a first lens element, wherein the first light beam sequentially passes through the first light-diffusing element, the first lens element, and the second light-diffusing element to form the illumination light beam, wherein the first light beam has a plurality of first sub-beams, the first light-diffusing element is disposed on transmission paths of the first sub-beams, and the first sub-beams pass through the first light-diffusing element to form a plurality of second sub-beams.

2. The illumination system of claim 1, wherein the first lens element is disposed between the first light-diffusing element and the second light-diffusing element.

3. The illumination system of claim 1, wherein a virtual-image light source is formed in front of the first lens element.

4. The illumination system of claim 1, wherein the second sub-beams respectively form a plurality of sub-virtual-image light sources in front of the first lens element, and the sub-virtual-image light sources overlap each other.

5. The illumination system of claim 1, wherein the first light beam is a collimated light beam.

6. The illumination system of claim 1, wherein the light-source module comprises a first light-emitting element, a second light-emitting element, and a third light-emitting element, the first light-emitting element is adapted to emit a first color light, the second light-emitting element is adapted to emit a second color light, and the third light-emitting element is adapted to emit a third color light.

7. The illumination system of claim 1, wherein the first light-diffusing element and the second light-diffusing element respectively comprises one of a micro-structured diffuser, a surface scattering diffuser, a volume scattering diffuser, a diffraction optical element, and a liquid crystal diffuser.

8. The illumination system of claim 1, wherein the illumination light beam has a light-imaging matching angle, and the light-imaging matching angle of the illumination light beam matches a viewing angle of a pupil of a projection device having the illumination system.

9. A projection device, comprising: an illumination system and an imaging system, wherein the illumination system is adapted to emit an illumination light beam, and the illumination system comprises: a light-source module and a light-shape adjustment module, wherein the light-source module is adapted to emit a first light beam; and the light-shape adjustment module is disposed on a transmission path of the first light beam and is adapted to adjust a light shape of the first light beam, and the light-shape adjustment module comprises: a first light-diffusing element, a second light-diffusing element, and a first lens element, wherein the first light beam sequentially passes through the first light-diffusing element, the first lens element, and the second light-diffusing element to form the illumination light beam; and the imaging system is configured on a transmission path of the illumination light beam, and the imaging system comprises a reflective light valve, and the reflective light valve is configured on the transmission path of the illumination light beam, wherein the reflective light valve is adapted to convert the illumination light beam into an image light beam, wherein the first light beam has a plurality of first sub-beams, the first light-diffusing element is disposed on transmission paths of the first sub-beams, and the first sub-beams pass through the first light-diffusing element to form a plurality of second sub-beams.

10. The projection device of claim 9, wherein the imaging system further comprises a microlens array, the microlens array comprises a plurality of microlenses and is disposed on the transmission path of the illumination light beam, the illumination light beam passes through the plurality of the microlenses in the microlens array to form a plurality of sub-illumination areas on the reflective light valve, and the plurality of sub-illumination areas corresponds to the plurality of the microlenses in the microlens array.

11. The projection device of claim 10, wherein principal rays of sub-illumination light beams of the illumination light beam are parallel lights before being projected to the reflective light valve.

12. The projection device of claim 10, wherein the reflective light valve comprises a plurality of image units, the sub-illumination areas respectively correspond to the image units, and a size of the sub-illumination areas matches a size of the image units.

13. The projection device of claim 9, wherein the first lens element is disposed between the first light-diffusing element and the second light-diffusing element.

14. The projection device of claim 9, wherein a virtual-image light source is formed in front of the first lens element.

15. The projection device of claim 9, wherein the second sub-beams respectively form a plurality of sub-virtual-image light sources in front of the first lens element, wherein the sub-virtual-image light sources overlap each other.

16. The projection device of claim 9, wherein the imaging system further comprises a light guiding element, the light guiding element is disposed on transmission paths of the illumination light beam and the image light beam, wherein the illumination light beam passes through the light guiding element and the microlens array in sequence to be transmitted to the reflective light valve, and the image light beam passes through the microlens array and the light guiding element in sequence to be transmitted to a pupil.

17. The projection device of claim 16, wherein the imaging system further comprises a second lens element, and the second lens element is disposed on the transmission paths of the illumination light beam and the image light beam, wherein the illumination light beam passes through the light guiding element and the second lens element in sequence to be transmitted to the microlens array, and the image light beam passes through the microlens array and the second lens element in sequence to be transmitted to the light guiding element.

* * * * *